US009265228B2

(12) United States Patent
Burton

(10) Patent No.: US 9,265,228 B2
(45) Date of Patent: Feb. 23, 2016

(54) RABBIT ORGANIC TRIMMER

(71) Applicant: Cambria Reagan Burton, Lyons, CO (US)

(72) Inventor: Cambria Reagan Burton, Lyons, CO (US)

( * ) Notice: Subject to any disclaimer, the term of this patent is extended or adjusted under 35 U.S.C. 154(b) by 183 days.

(21) Appl. No.: 14/275,050

(22) Filed: May 12, 2014

(65) Prior Publication Data
US 2014/0245965 A1 Sep. 4, 2014

(51) Int. Cl.
*A01K 5/00* (2006.01)
*A01K 1/00* (2006.01)
*A01K 1/02* (2006.01)
*A01K 1/03* (2006.01)
*A01K 31/07* (2006.01)
*A01D 34/00* (2006.01)

(52) U.S. Cl.
CPC ............... *A01K 1/0035* (2013.01); *A01D 34/00* (2013.01); *A01K 1/0236* (2013.01); *A01K 1/032* (2013.01); *A01K 31/07* (2013.01)

(58) Field of Classification Search
CPC ... A01K 1/035; A01K 1/0236; A01K 1/0245; A01K 1/0281; A01K 1/032; A01K 31/07; A01D 34/01; A01D 34/015; B62B 5/0013
USPC ......................................................... 119/454
See application file for complete search history.

(56) References Cited

U.S. PATENT DOCUMENTS

| 3,077,181 | A | * | 2/1963 | Marquette | A01K 1/032 119/472 |
| 4,796,565 | A | * | 1/1989 | Charbeneau | A01K 1/0236 119/727 |
| 5,113,793 | A | * | 5/1992 | Leader | A01K 1/0245 119/453 |
| 5,988,110 | A | * | 11/1999 | Peterson | A01K 1/03 119/453 |
| 6,223,691 | B1 | * | 5/2001 | Beattie | A01K 1/0236 119/453 |
| D453,593 | S | * | 2/2002 | Licciardello | D30/109 |
| 6,374,775 | B1 | * | 4/2002 | Baumsteiger | A01K 1/0245 119/496 |
| D475,660 | S | * | 6/2003 | Licciardello | D12/129 |
| 6,896,272 | B1 | * | 5/2005 | Burton | B62B 3/00 119/496 |
| 7,152,554 | B2 | * | 12/2006 | Crawford | A01K 1/0245 119/453 |
| 7,568,450 | B2 | * | 8/2009 | Chen | A01K 1/0254 119/453 |
| 8,950,767 | B2 | * | 2/2015 | Carter | B62K 27/003 280/202 |
| 2005/0166861 | A1 | * | 8/2005 | King | A01K 1/0245 119/496 |
| 2006/0048716 | A1 | * | 3/2006 | Garofola | A01K 1/0236 119/453 |
| 2014/0116347 | A1 | * | 5/2014 | Casto | A01K 1/03 119/474 |

OTHER PUBLICATIONS

Lawn Mowing Zen, Ray Bradbury, and Pink Grass; May 7, 2013; CAST.*
The Most Ridiculous Custom Lawn Mowers; Sep. 7, 2013; Complex.*

* cited by examiner

*Primary Examiner* — Kristen C Hayes

(57) ABSTRACT

The present invention relates to organic lawnmowers, and in particular an organic lawnmower including a kennel for a rabbit. The lawnmower includes a wooden frame, a screen spanning the frame, an animal kennel resting on the frame above the screen, and a rabbit occupying the kennel. The lawnmower is pushed to a desired location in a grass lawn, and the rabbit grazes the grass at his or her leisure, through the screen. The lawnmower is periodically moved to a fresh patch of grass, and the grazing continues. This improved lawnmower is economical, enjoyable, and environmentally friendly.

10 Claims, 2 Drawing Sheets

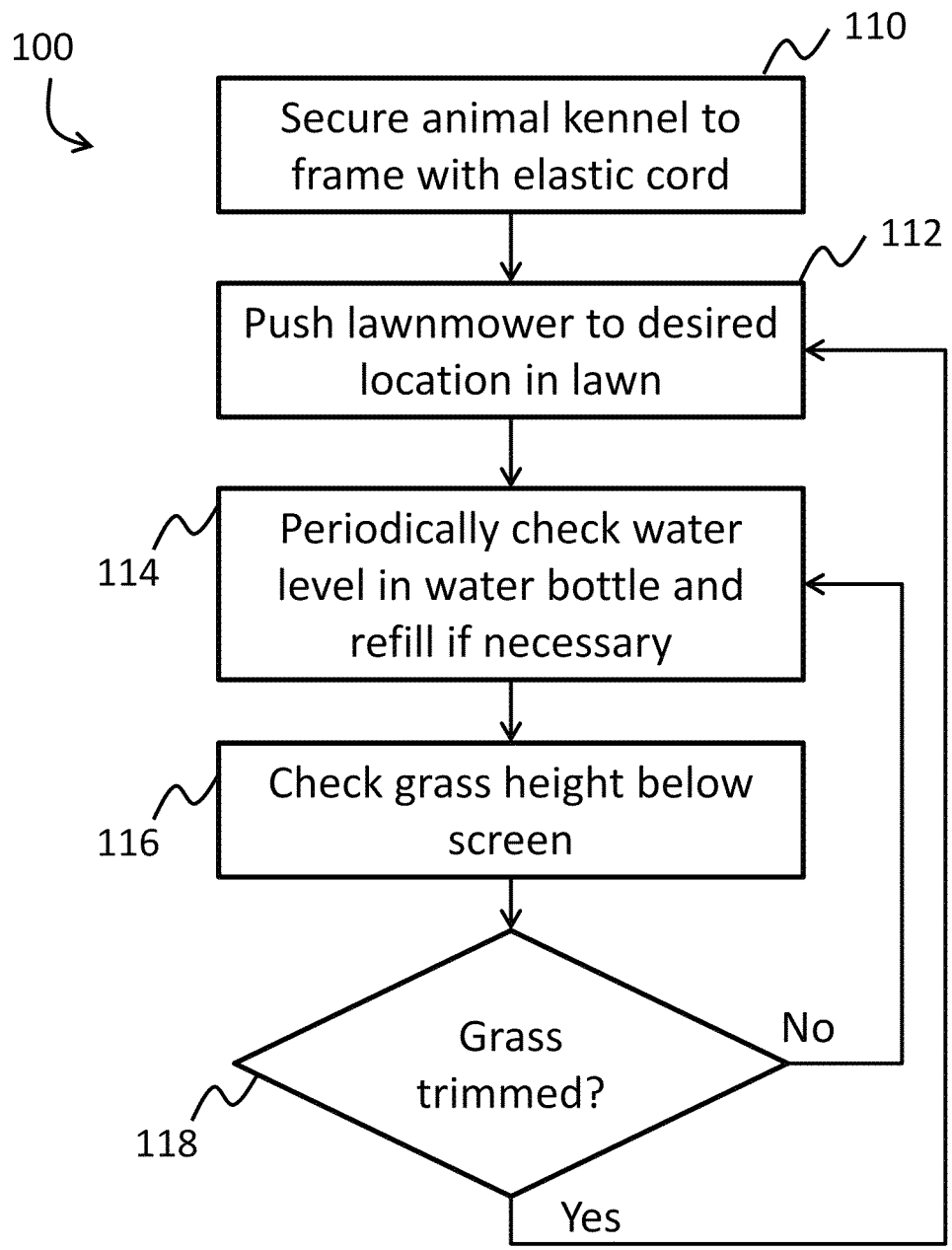

RABBIT ORGANIC TRIMMER

FIELD

The present invention relates to organic lawnmowers, and in particular an organic lawnmower including a kennel for a rabbit.

BACKGROUND

Grass lawns are a popular attraction in many residential neighborhoods. These grass lawns require trimming or mowing to maintain the blades of grass at a consistent height that is best for recreational uses. Grass that is cut too short may have difficulty re-growing, while grass that grows too long may hamper lawn activities and encourage habitation by unwanted pests.

Conventional lawn trimming equipment includes push mowers, which can be difficult to operate, and larger powered lawnmowers, which contribute to both air and noise pollution, and require maintenance. Trimming the lawn with conventional mowing equipment is often viewed as an unwelcome chore.

Accordingly, there is a need for a more attractive, more fun, and more environmentally friendly approach to residential lawn mowing.

SUMMARY

According to an embodiment, an organic lawnmower includes a wooden frame mounted on a set of wheels. The wooden frame includes an inner shelf surrounding an open center. The lawnmower also includes a screen attached to the frame along the inner shelf, such that the screen spans the open center of the wooden frame. The lawnmower also includes a push handle coupled to and extending upwardly from the wooden frame, and an animal kennel resting on the wooden frame above the screen. The animal kennel has a housing defining an enclosure for occupancy by an animal. The housing has an open floor above the screen, a roof, and a carrying handle attached to the roof. The lawnmower also includes a water bottle secured to the animal kennel, and an elastic cord having first and second hooks at first and second opposite ends of the elastic cord. The elastic cord is threaded between the carrying handle and the roof of the animal kennel and hooked to the wooden frame or to the push handle with the first and second hooks, to removably secure the animal kennel to the frame.

BRIEF DESCRIPTION OF THE DRAWINGS

FIG. 2 is a flowchart illustrating a method for organically trimming a lawn, according to an embodiment.

DETAILED DESCRIPTION

Figure 1:
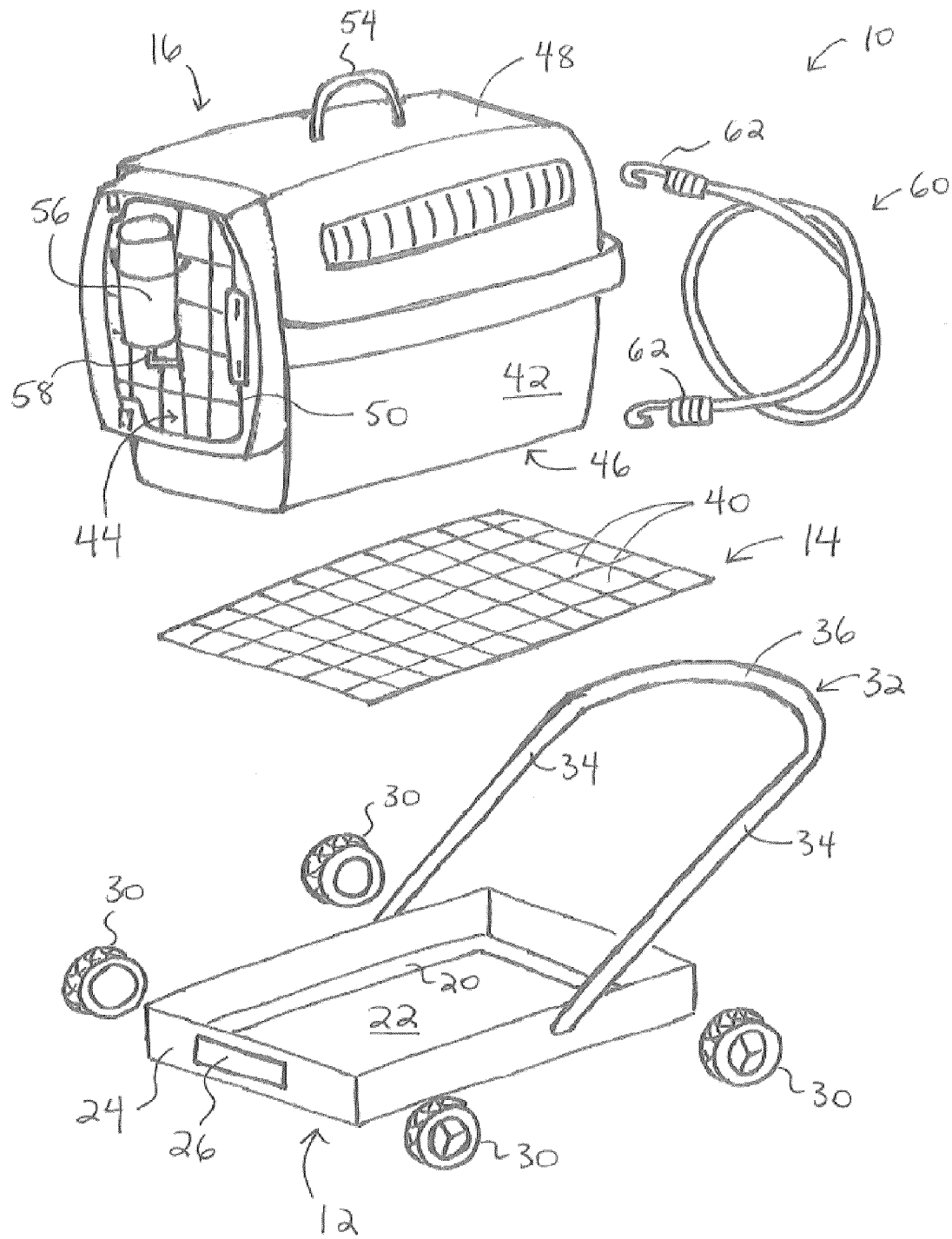
FIG. 1 is an exploded view of an organic lawnmower, according to an embodiment.

The present invention relates to organic lawnmowers, and in particular an organic lawnmower including a kennel for a rabbit. In one example, the lawnmower includes a wooden frame, a screen spanning the frame, an animal kennel resting on the frame above the screen, and a rabbit occupying the kennel. The lawnmower is pushed to a desired location in a grass lawn, and the rabbit grazes the grass at his or her leisure, through the screen. The lawnmower is periodically moved to a fresh patch of grass, and the grazing continues. This improved lawnmower is economical, enjoyable, and environmentally friendly.

An exploded view of an example of a rabbit lawnmower is shown in FIG. 1. The lawnmower 10 includes a wooden frame 12, a screen 14, and an animal kennel 16. The wooden frame 12 is rectangular in shape, and is sized to accommodate the animal kennel 16. In one example, the kennel 16 is approximately one foot wide, two feet long, and one foot tall, and the frame is sized to have a small clearance, such as one inch, around the kennel. The wooden frame includes an inner shelf 20 that defines a central opening 22. The inner shelf 20 surrounds the opening 22 and provides a support for the other components of the lawnmower, while enabling access to the grass below. The wooden frame also includes a front face 24 which may, optionally, bear a name, logo, or other message 26. For example, the message 26 may display the name of the rabbit.

The wooden frame is mounted on a set of four wheels 30. The wheels can be mounted to the frame in any suitable manner, such as a by attaching each one with a lag bolt and washer, with screws, on an axle, or by other mechanisms. The wheels can be mounted on swivels to facilitate steering the mower to push it to a desired location. One or more of the wheels 30 may include a brake which can be closed against the wheel or axle to lock it and prevent the wheel from turning. This brake can be used to secure the lawnmower in place and prevent it from rolling away from a patch of yard that needs trimming.

A push handle 32 is also attached to the wooden frame (or, optionally, to the rear wheels), to facilitate pushing the mower around a lawn. The push handle 32 includes two rods or poles 34 extending from the frame and curving together to form a grip 36. The grip optionally includes a tacky or textured surface for easy gripping. The poles 34 may be telescoping poles to enable adjustment of the length and/or height of the handle 32.

The screen 14 of the lawnmower is attached to the frame 12 along the inner shelf 20, such as by stapling or gluing the screen 14 to the shelf 20. The screen may be a sheet made of wire (such as chickenwire), mesh, or similar materials. The screen includes a large number of small openings 40 sized to allow entry of the blades of grass through the small openings and into the animal kennel. The size of these openings may be chosen for a particular lawn, such as having smaller openings (via a finer wire or mesh) for very thin blades of grass, and larger openings for wider blades of grass or other plants to be trimmed (such as dandelions). The purpose of the screen is to establish a height for the trimming by the rabbit. The portion of the plant that is below the screen is shielded from the rabbit's grazing. The screen establishes the desired height of trimming, so that the grass is not trimmed too short or too tall. This trimming height can be adjusted by moving the screen up or down—for example, by moving the frame up or down with respect to the wheels, or pushing the screen up or down (bending it toward the ground for shorter grass, or bending it up for longer grass).

The animal kennel 16 (or carrier or crate) rests on the frame 12, such as on the inner shelf 20, above the screen 14. The animal kennel 16 includes a housing 42 defining an interior enclosure 44 for occupancy by the rabbit. The interior enclosure 44 is closed by a wire or screen door 50. The housing includes a floor 46 and a roof 48. The floor 46 includes an open area that is open to the screen below, such as by cutting out an area of the floor to provide a large opening. This open area enables the grass to enter the housing for the rabbit to graze. The rabbit will not fall through the opening, because the screen 14 helps to support the rabbit when the kennel is placed on the lawnmower. A carrying handle 54 is attached to the roof 48 of the housing. This carrying handle can be used to lift the kennel onto and off of the wooden frame.

The kennel also includes a water bottle 56 secured to the kennel, with a spout 58 that is accessible from inside the enclosure 44. In one example, the water bottle 56 is secured to the door 50 of the kennel, and is easily viewable so that it can be periodically checked and re-filled. The kennel may also include a food tray (not shown).

When in use, the kennel also includes a rabbit, which is not shown in the figures. Example rabbits include cottontail rabbits, which are prevalent in some residential areas and need homes and food. The lawnmower can be provided in different sizes, such as a larger animal kennel and frame that can house two rabbits, or more, in the same kennel. If one rabbit is sleeping, the other rabbits can continue to graze the lawn. Other small animals could be used, similar in size to a rabbit, such as a small baby goat.

The animal kennel 16 is removable from the frame, not permanently attached to it. To prevent the kennel from sliding or falling off the frame, especially when the lawnmower is in motion, an elastic cord 60 is provided. The elastic cord 60 includes first and second hooks 62 at opposite ends of the cord. To secure the kennel 16 to the wooden frame 12, the elastic cord 60 is passed under the carrying handle 54 of the kennel, threaded between the carrying handle 54 and the roof 48. The hooks 62 are then attached to the wooden frame itself, or to the push handle 32, such as by hooking the hooks 62 around the rods or poles 34. The cord should stretch when it is secured in place, so that it holds the kennel tightly in place, with the cord in tension. If the cord is too long and does not stretch when put in place, a shorter cord should be used. Alternatively, the kennel may be secured to the frame with rope that is tied into a knot or loop.

An example of a method for mowing a lawn with an organic lawnmower is illustrated in FIG. 2. The method 100 includes securing an animal kennel to a wooden frame with an elastic cord, at 110. The method then includes pushing the lawnmower to a desired location in a lawn, such as to a patch of grass that needs trimming, at 112. The method also includes periodically checking the water level in the water bottle and refilling if necessary, at 114. This is to ensure that the rabbit inside the kennel remains hydrated. The method also includes checking the grass height below the screen to see if it has been sufficiently trimmed, at 116. If the grass has been sufficiently trimmed, then the method returns to step 112, to push the lawnmower to a new location. If the grass is not sufficiently trimmed, then the method returns to step 114.

The organic lawnmower described here has many benefits over conventional push and powered mowers. The lawnmower includes built-in fertilization to the lawn, as the rabbit droppings can pass straight through the screen 14 onto the grass lawn, providing all-natural fertilization. The lawnmower also reduces air and noise emissions. In addition to grass, the rabbit may also trim other plants within its diet, such as dandelions. When not in use for grazing, the rabbit is an enjoyable family pet. Thus, the rabbit-occupied lawnmower provides a home for a cute and friendly rabbit, gives the rabbit a safe enclosure and a fresh diet, and enables everyone to enjoy a beautiful lawn.

What is claimed is:

1. An organic lawnmower, comprising:
   a wooden frame mounted on a set of wheels, the wooden frame including an inner shelf surrounding an open center;
   a screen attached to the frame along the inner shelf, such that the screen spans the open center of the wooden frame;
   a push handle coupled to and extending upwardly from the wooden frame;
   an animal kennel resting on the wooden frame above the screen, the animal kennel having a housing defining an enclosure for occupancy by an animal, wherein the housing comprises an open floor above the screen, a roof, and a carrying handle attached to the roof;
   a water bottle secured to the animal kennel; and
   an elastic cord having first and second hooks at first and second opposite ends of the elastic cord, wherein the elastic cord is threaded between the carrying handle and the roof of the animal kennel and hooked to the wooden frame or to the push handle with the first and second hooks, to removably secure the animal kennel to the frame.

2. The lawnmower of claim 1, wherein the push handle comprises adjustable telescoping poles attaching the push handle to the wooden frame.

3. The lawnmower of claim 1, wherein the screen comprises a mesh sheet.

4. The lawnmower of claim 1, wherein the screen comprises a sheet of chickenwire.

5. The lawnmower of claim 1, further comprising a brake coupled to at least one wheel of the set of wheels.

6. The lawnmower of claim 1, wherein the screen comprises a plurality of small openings sized to allow entry of blades of grass through the small openings and through the open floor of the animal kennel into the enclosure.

7. The lawnmower of claim 1, wherein the screen is bendable to adjust a clearance of the screen above the ground.

8. The lawnmower of claim 1, wherein the water bottle comprises a spout accessible from the enclosure.

9. The lawnmower of claim 1, further comprising a rabbit occupying the animal kennel.

10. The lawnmower of claim 1, wherein the elastic cord is in tension around the animal kennel.

* * * * *